(No Model.)

C. A. BRITTAIN.
STRAP LOOP.

No. 532,864.  Patented Jan. 22, 1895.

Witnesses.
David C. Walter
L. E. Brown.

Inventor.
Charles A. Brittain
By Almon Hall
His Atty.

UNITED STATES PATENT OFFICE.

CHARLES A. BRITTAIN, OF BRYAN, OHIO.

STRAP-LOOP.

SPECIFICATION forming part of Letters Patent No. 532,864, dated January 22, 1895.

Application filed June 8, 1894. Serial No. 513,861. (No model.)

*To all whom it may concern:*

Be it known that I, CHARLES A. BRITTAIN, a citizen of the United States, residing at Bryan, Williams county, Ohio, have invented a certain new and useful Improvement in Safety-Loops for Straps, Harness, &c., of which the following is a specification.

My invention relates to and its object is to provide a cheap, simple and efficient metal safety loop for use in harness and other places where straps of leather or like material are to be detachably attached to other objects. I attain this object by means of the device hereinafter described and shown and illustrated in the accompanying drawings, made part hereof, in which—

Figure 1:
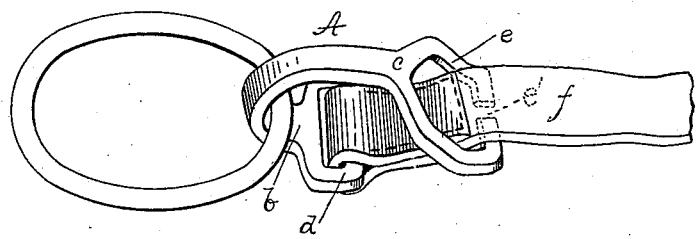
Figure 2:
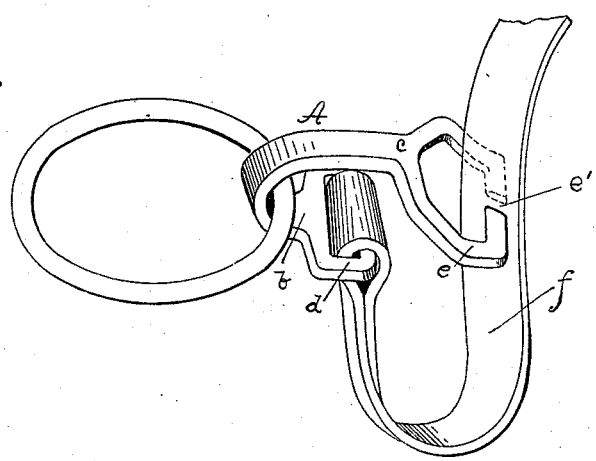
Figure 3:
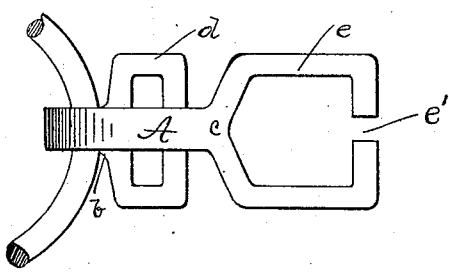

Figure 1, is a perspective view of my device attached, for illustration, to a ring. Fig. 2, is the same, showing manner of engaging or disengaging my device; and Fig. 3, is a plan view of my device with its strap removed.

In the drawings, A is a flat strip of metal bent in the plane of its thickness to form a loop having legs $b$, $c$, of unequal length. Leg $b$ terminates in a closed link or eye $d$, and leg $c$ terminates in a link or eye $e$ having opening $e'$. The extremities of these links or eyes lie substantially in the same plane. A strap $f$ is sewed or otherwise secured to link or eye $d$ as in Figs. 1 and 2.

When it is desired to attach the strap to a ring, hook, staple, buckle, or other object, the longer leg of loop A, (being disengaged from the strap,) is hooked over such object and the strap is slackened and slipped edgewise into eye or link $e$ through opening $e'$, which is barely large enough to receive the thickness of the strap. The strap is now drawn taut and the loop is complete and cannot be opened except by again slackening the strap and passing it, edgewise, out through opening $e'$.

It will be seen that my metal loop is of a single, integral piece, that it may be easily and cheaply manufactured and can be used in lieu of the ordinary snap hook and in many places instead of a buckle.

Having described my invention and the manner of using the same, what I claim, and desire to secure by Letters Patent, is—

A safety-loop comprising a strip or shank of metal (A) bent in the plane of its thickness to form a loop having legs ($b$, $c$), of unequal length, in combination with an open link or eye ($e'$), upon the longer of said legs, and a closed link or eye ($d$) upon the shorter of said legs, said links or eyes being disposed in approximately the same plane, substantially as and for the purpose specified.

CHARLES A. BRITTAIN.

Witnesses:
CLINTON PAINE,
G. W. HARDING.